(12) United States Patent
Khazeni et al.

(10) Patent No.: US 9,891,774 B2
(45) Date of Patent: Feb. 13, 2018

(54) TOUCH NOISE CANCELING FOR DOT-INVERSION DRIVING SCHEME

(71) Applicant: SYNAPTICS INCORPORATED, San Jose, CA (US)

(72) Inventors: Kasra Khazeni, San Jose, CA (US); Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 93 days.

(21) Appl. No.: 14/986,099

(22) Filed: Dec. 31, 2015

(65) Prior Publication Data

US 2017/0192554 A1    Jul. 6, 2017

(51) Int. Cl.
G06F 3/045 (2006.01)
G06F 3/044 (2006.01)
G06F 3/041 (2006.01)
G09G 3/20 (2006.01)

(52) U.S. Cl.
CPC .............. *G06F 3/044* (2013.01); *G06F 3/041* (2013.01); *G06F 3/0418* (2013.01); *G09G 3/20* (2013.01); *G06F 3/0412* (2013.01)

(58) Field of Classification Search
CPC combination set(s) only.
See application file for complete search history.

(56) References Cited

U.S. PATENT DOCUMENTS

| | | |
|---|---|---|
| 7,417,441 B2 | 8/2008 | Reynolds |
| 7,583,092 B2 | 9/2009 | Reynolds et al. |
| 8,766,950 B1 * | 7/2014 | Morein .................. G06F 3/044 345/173 |
| 2008/0062148 A1 | 3/2008 | Hotelling et al. |
| 2010/0001973 A1 | 1/2010 | Hotelling et al. |
| 2010/0193257 A1 | 8/2010 | Hotelling et al. |
| 2010/0194695 A1 | 8/2010 | Hotelling et al. |
| 2010/0328291 A1 | 12/2010 | Ishizaki et al. |

(Continued)

OTHER PUBLICATIONS

International Application No. PCT/US2016/066984, International Search Report and Written Opinion dated Apr. 3, 2017, consists of 11 pages.

(Continued)

*Primary Examiner* — Carolyn R Edwards
*Assistant Examiner* — Sosina Abebe
(74) *Attorney, Agent, or Firm* — Paradice and Li LLP (57) ABSTRACT

Techniques for removing display-based corrupting components from a capacitive sensing signal are provided. A routing carrying display related signals (e.g., a source signal for sub-pixel updating) may induce corrupting current into a routing for carrying capacitive sensing signals. This corrupting current may reduce the ability to determine presence of an input object via the sensing signal. Therefore, the corrupting signal is effectively removed by driving the display elements with a dot inversion technique and by performing capacitive sensing for a sensor electrode during a time in which an even number of display rows are driven for display updates. Dot inversion causes the corrupting current to alternate polarity. Thus, driving sensor electrodes in a period of time in which an even number of rows is driven means that an equal number of positive and negative polarity corrupting currents are induced into the sensing signal.

18 Claims, 6 Drawing Sheets

(56) References Cited

U.S. PATENT DOCUMENTS

| | | |
|---|---|---|
| 2011/0210941 A1* | 9/2011 | Reynolds .............. G06F 3/0418 345/174 |
| 2011/0284949 A1 | 11/2011 | Meng et al. |
| 2011/0298746 A1 | 12/2011 | Hotelling |
| 2012/0081347 A1 | 4/2012 | Kim |
| 2012/0182251 A1 | 7/2012 | Krah |
| 2013/0215075 A1 | 8/2013 | Lee et al. |
| 2013/0314360 A1 | 11/2013 | Saitoh et al. |
| 2013/0321296 A1 | 12/2013 | Lee et al. |
| 2015/0091843 A1 | 4/2015 | Ludden |
| 2015/0309612 A1 | 10/2015 | Morein et al. |

OTHER PUBLICATIONS

Phillippe Lambinet, FOGALE nanotech, presentation materials dared, May 22, 2013, France.

* cited by examiner

TOUCH NOISE CANCELING FOR DOT-INVERSION DRIVING SCHEME

BACKGROUND

Field of the Disclosure

Embodiments generally relate to input sensing and, in particular, to cancelling display noise in concurrent display and touch sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Proximity sensor devices may include display elements that are driven for updates concurrently with performing proximity sensing. A routing carrying display related signals (e.g., a source signal for sub-pixel updating) to the display elements may induce a corrupting current into a routing for carrying proximity sensing signal. This corrupting current would reduce the ability to determine presence of an input object via the sensing signal.

SUMMARY

A processing system configured for updating a display and performing capacitive sensing is provided. The processing system includes a display driver coupled to a plurality of rows of sub-pixel elements. The display driver is configured to drive a first sub-pixel element of a first row of the plurality of rows of sub-pixel elements with a first update signal having a first polarity and drive a second sub-pixel element of a second row of the plurality of rows of sub-pixel elements with a second update signal having a second polarity to update the display during a first display update period, wherein the first polarity is opposite the second polarity, wherein the first sub-pixel element of the first row and the second sub-pixel element of the second row are selectively coupleable to a source driver through a first source line, and wherein the first row is adjacent to the second row. The processing system also includes sensor circuitry configured to receive resulting signals with a sensor electrode routing located proximate to the first source line and coupled to a sensor electrode during a first sensing period, wherein the first sensing period at least partially overlaps the first display update period, and wherein during the first sensing period an even number of rows of the plurality of rows are driven for display updates.

An input device configured for updating a display and performing capacitive sensing is also provided. The input device includes a processing system comprising a display driver and a sensor circuitry, a plurality of rows of sub-pixel elements coupled to the processing system via a plurality of source lines, and a plurality of sensor electrodes coupled to the processing system via a plurality of sensor electrode routings. The display driver is configured to drive a first sub-pixel element of a first row of the plurality of rows of sub-pixel elements with a first update signal having a first polarity and drive a second sub-pixel element of a second row of the plurality of rows of sub-pixel elements with a second update signal having a second polarity to update the display during a first display update period, wherein the first polarity is opposite the second polarity, wherein the first sub-pixel element of the first row and the second sub-pixel element of the second row are selectively coupleable to a source driver through a first source line of the plurality of source lines, and wherein the first row is adjacent to the second row. The sensor circuitry is configured to receive resulting signals with a sensor electrode routing of the plurality of sensor electrode routings, the sensor electrode routing being located proximate to the first source line and coupled to a sensor electrode during a first sensing period, wherein the first sensing period at least partially overlaps the first display update period, and wherein during the first sensing period an even number of rows of the plurality of rows are driven for display updates.

A method for updating a display and performing capacitive sensing is provided. The method includes driving a first sub-pixel element of a first row of a plurality of rows of sub-pixel elements of a display with a first update signal having a first polarity. The method also includes driving a second sub-pixel element of a second row of the plurality of rows of sub-pixel elements with a second update signal having a second polarity to update the display during a first display update period, wherein the first polarity is opposite the second polarity, wherein the first sub-pixel element of the first row and the second sub-pixel element of the second row are selectively coupleable to a source driver through a first source line, and wherein the first row is adjacent to the second row. The method further includes receiving resulting signals with a sensor electrode routing located proximate to the first source line and coupled to a sensor electrode during a first sensing period, wherein the first sensing period at least partially overlaps the first display update period, and wherein during the first sensing period an even number of rows of the plurality of rows are driven for display updates.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide techniques for removing display-based corrupting components from a capacitive sensing signal. A routing carrying display related signals (e.g., a source signal for sub-pixel updating) may induce corrupting current into a routing for carrying capacitive sensing signals. This corrupting current may reduce the ability to determine presence of an input object via the sensing signal. Therefore, the corrupting signal is effectively removed by driving the display elements with a dot inversion technique and by performing capacitive sensing for a sensor electrode during a time in which an even number of display rows are driven for display updates. Dot inversion causes the corrupting current to alternate polarity. Thus, driving sensor electrodes in a period of time in which an even number of rows is driven means that an equal number of positive and negative polarity corrupting currents are induced into the sensing signal.

Figure 1:
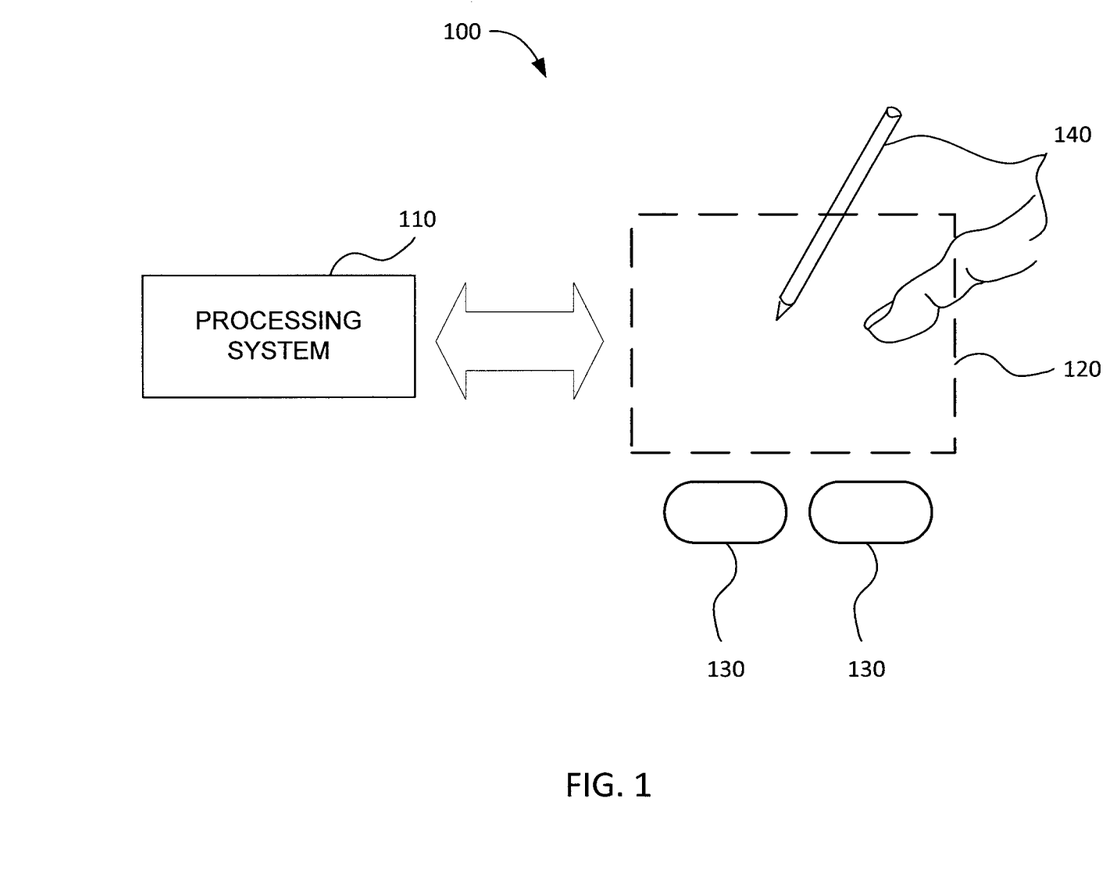
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
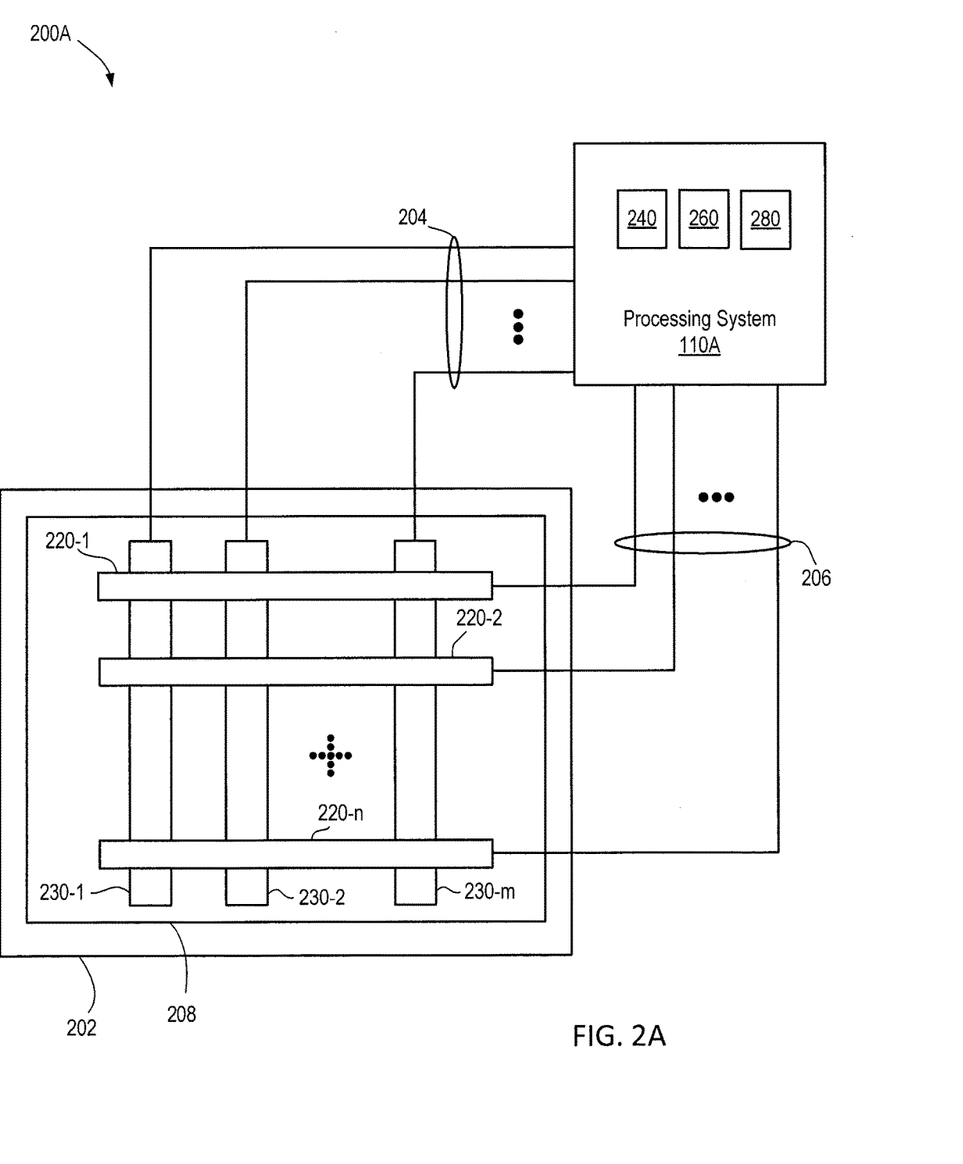
FIG. 2A is a block diagram depicting a capacitive sensor device according to an example.

FIG. 2A is a block diagram depicting a capacitive sensor device 200A according to an example. The capacitive sensor device 200A comprises an example implementation of the input device 100 shown in FIG. 1. The capacitive sensor device 200A includes a sensor electrode collection 208 coupled to an example implementation of the processing system 110 (referred to as "the processing system 110A"). As used herein, general reference to the processing system 110 is a reference to the processing system described in FIG. 1 or any other embodiment thereof described herein (e.g., the processing system 110A, 110B, etc.). Note that in some embodiments, unless otherwise stated, processing system 110B performs the same functionality as processing system 110A.

The sensor electrode collection 208 is disposed on a substrate 202 to provide the sensing region 120. The sensor electrode collection 208 includes sensor electrodes disposed on the substrate 202. In the present example, the sensor electrode collection 208 includes two pluralities of sensor electrodes 220-1 through 220-N (collectively "sensor electrodes 220"), and 230-1 through 230-M (collectively "sensor electrodes 230"), where M and N are integers greater than zero. The sensor electrodes 220 and 230 are separated by a dielectric (not shown). The sensor electrodes 220 and the sensor electrodes 230 can be non-parallel. In an example, the sensor electrodes 220 are disposed orthogonally with the sensor electrodes 230.

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensor electrode collection 208 is shown with the sensor electrodes 220, 230 generally arranged in a rectangular grid of intersections of orthogonal sensor electrodes. It is to be understood that the sensor electrode collection 208 is not limited to such an arrangement, but instead can include numerous sensor patterns. Although the sensor electrode collection 208 is depicted as rectangular, the sensor electrode collection 208 can have other shapes, such as a circular shape.

As discussed below, the processing system 110A can operate the sensor electrodes 220, 230 according to a plurality of excitation schemes, including excitation scheme(s) for mutual capacitance sensing ("transcapacitive sensing") and/or self-capacitance sensing ("absolute capacitive sensing"). In a transcapacitive excitation scheme, the processing system 110A drives the sensor electrodes 230 with transmitter signals (the sensor electrodes 230 are "transmitter electrodes"), and receives resulting signals from the sensor electrodes 220 (the sensor electrodes 220 are "receiver electrodes"). In some embodiments, sensor electrodes 220 may be driven as transmitter electrodes and sensor electrodes 230 may be operated as receiver electrodes. The sensor electrodes 230 can have the same or different geometry as the sensor electrodes 220. In an example, the sensor electrodes 230 are wider and more closely distributed than the sensor electrodes 220, which are thinner and more sparsely distributed. Similarly, in an embodiment, sensor electrodes 220 may be wider and/or more sparsely distributed. Alternatively, the sensor electrodes 220, 230 can have the same width and/or the same distribution.

The sensor electrodes 220 and the sensor electrodes 230 are coupled to the processing system 110A by conductive routing traces 204 and conductive routing traces 206, respectively. The processing system 110A is coupled to the sensor electrodes 220, 230 through the conductive routing traces 204, 206 to implement the sensing region 120 for sensing inputs. Each of the sensor electrodes 220 can be coupled to at least one routing trace of the routing traces 206. Likewise, each of the sensor electrodes 230 can be coupled to at least one routing trace of the routing traces 204.

Figure 2B:
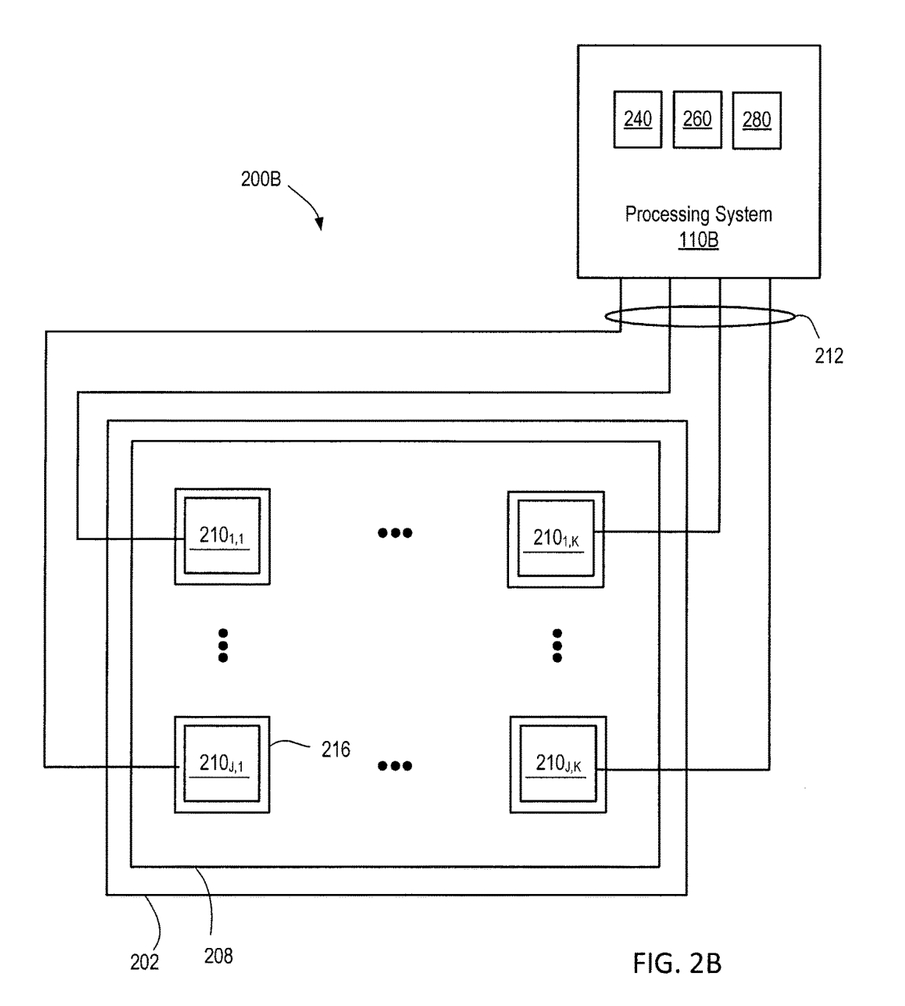
FIG. 2B is a block diagram depicting another capacitive sensor device according to an example.

FIG. 2B is a block diagram depicting a capacitive sensor device 200B according to an example. The capacitive sensor device 200B comprises another example implementation of the input device 100 shown in FIG. 1. In the present example, the sensor electrode collection 208 includes a plurality of sensor electrodes $210_{1,1}$ through $210_{J,K}$, where J and K are integers (collectively "sensor electrodes 210"). In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. In various embodiments, the grid electrode(s) is optional and may not be included. Similar to the capacitive sensor device 200A, the processing system 110B can operate the sensor electrodes 210 according to a plurality of excitation schemes, including excitation scheme(s) for transcapacitive sensing and/or absolute capacitive sensing.

In some examples, the sensor electrodes 210 can be disposed on separate layers of the substrate 202. In other examples, the sensor electrodes 210 can be disposed on a single layer of the substrate 202. The sensor electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

The processing system 110B is coupled to the sensor electrodes 210 through the conductive routing traces 212 to implement the sensing region 120 for sensing inputs. In one or more embodiments, sensor electrode collection 208 may further comprise one or more grid electrodes that are disposed between sensor electrodes 210. The grid electrode(s) may at least partially encompass one or more of the sensor electrodes 210.

Referring to FIGS. 2A and 2B, the capacitive sensor device 200A or 200B can be utilized to communicate user input (e.g., a user's finger, a probe such as a stylus, and/or some other external input object) to an electronic system (e.g., computing device or other electronic device). For example, the capacitive sensor device 200A or 200B can be implemented as a capacitive touch screen device that can be placed over an underlying image or information display device (not shown). In this manner, a user would view the underlying image or information display by looking through substantially transparent elements in the sensor electrode collection 208. When implemented in a touch screen, the substrate 202 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode collection 208.

In another example, the capacitive sensor device 200A or 200B can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensor electrode collection 208.

In general, the processing system 110 (e.g., processing system 110A or processing system 110B) excites or drives sensing elements of the sensor electrode collection 208 with a sensing signal and measures an induced or resulting signal that includes effects corresponding to at least one of the sensing signal, an input object, and interference in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110 drives one or more sensor electrodes of the sensor electrode collection 208 with a voltage and senses resulting respective charge on the sensor electrode(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110 can determine measurement(s) of capacitance from the sensed charge. In another example, the processing system 110 drives one or more sensor electrodes of the sensor electrode collection 208 with charge and senses resulting respective voltage on sensor electrode(s). That is, the sensing signal is a signal to cause accumulation of charge (e.g., current signal) and the resulting signal is a voltage signal. The processing system 110 can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110 can include a sensor circuitry 240. The sensor circuitry 240 performs sensing-related functions of the processing system 110, such as driving sensor electrodes with signals for sensing, receiving signals from sensor electrode for processing, and other functions. The sensor circuitry 240 may be part of a sensor module that includes firmware, software, or a combination thereof operating in cooperation with the circuitry.

In some embodiments processing system 110 includes a determination module 260. The determination module 260 may be embodied as, or may include, a determination processor that is configured to perform some or all of the operations described as being performed by the determination module 260 herein, such as analyzing signals received via sensor circuitry 240 to determine presence of an input object. In some embodiments, the determination processor is a microprocessor, microcontroller, or other instruction processing electronic element that executes instructions, in the form of software or firmware, for performing such operations. In other embodiments, the determination processor is an application specific integrated circuit having circuit elements selected and arranged to perform the described operations. Note that in various embodiments, the determination processor is included within the same integrated circuit as some or all of the other portions of the processing system 110.

Note that functionality performed by sensor circuitry 240 and determination module 260 may be considered to be performed by processing system 110. Note also that although both sensor circuitry 240 and determination module 260 are described, and that specific functionality are ascribed to these elements, in various embodiments, functionality may be split amongst the sensor circuitry 240 and determination module 260 in different ways.

The sensor circuitry 240 selectively drives sensing signal(s) on one or more sensing elements of the sensor electrode collection 208 over one or more cycles ("excitation cycles") in accordance with one or more schemes ("excitation schemes"). During each excitation cycle, the sensor circuitry 240 can selectively sense resulting signal(s) from one or more sensing elements of the sensor electrode collection 208. Each excitation cycle has an associated time period during which sensing signals are driven and resulting signals measured.

In one type of excitation scheme, the sensor circuitry 240 can selectively drive sensing elements of the sensor electrode collection 208 for absolute capacitive sensing. In absolute capacitive sensing, the sensor circuitry 240 drives selected sensor electrode(s) with an absolute sensing signal and senses resulting signal(s) from the selected sensor electrode(s). In such an excitation scheme, measurements of absolute capacitance between the selected sensing element(s) and input object(s) are determined from the resulting signal(s). In an example, the sensor circuitry 240 can drive selected sensor electrodes 220, and/or selected sensor electrodes 230, with an absolute sensing signal. In another example, the sensor circuitry 240 can drive selected sensor electrodes 210 with an absolute sensing signal.

In another type of excitation scheme, the sensor circuitry 240 can selectively drive sensing elements of the sensor electrode collection 208 for transcapacitive sensing. In transcapacitive sensing, the sensor circuitry 240 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor circuitry 240 can drive the sensor electrodes 230 with transmitter signal(s) and receive resulting signals on the sensor electrodes 220. In another example, the sensor circuitry 240 can drive selected sensor electrodes 210 with transmitter signal(s), and receive resulting signals from others of the sensor electrodes 210.

In any excitation cycle, the sensor circuitry 240 can drive sensing elements of the sensor electrode collection 208 with other signals, such as shielding or shield signals. A shield signal may be any substantially constant voltage signal or a varying voltage signal. The sensor electrodes of sensor electrode collection 208 that are not driven with a sensing signal, or sensed to receive resulting signals, can be driven with a shield signal or left floating (i.e., not driven with any signal). The shield signal may be a ground signal (e.g., system ground) of the input device. A shield signal comprising a varying voltage signal may also be referred to as a guard signal. Such a signal can be a signal that is similar or the same in at least one of shape, amplitude, frequency, or phase of a transmitter signal or the absolute capacitive sensing signal.

"System ground" may indicate any reference voltage of the input device 100. For example, a capacitive sensing system of a mobile device can, at times, be referenced to a system ground provided by the phone's power source (e.g., a charger or battery). The system ground may not be fixed relative to earth or any other reference. For example, a mobile device on a table usually has a floating system ground. A mobile device being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200A or 200B can be located proximate to such a system ground electrode (e.g., located above a ground plane or backplane).

The determination module 260 performs capacitance measurements based on resulting signals obtained by the sensor circuitry 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode collection 208. For example, a capacitive pixel can correspond to a transcapacitive coupling between a sensor electrode 220 and a sensor electrode 230 affected by input object(s). In another example, a capacitive pixel can correspond to an absolute capacitance of a sensor electrode 210. The determination module 260 can determine an array of capacitive coupling changes using the resulting signals obtained by the sensor circuitry 240 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110 can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes 220 and/or the sensor electrodes 230 to produce capacitive profile(s). The array of capacitive coupling changes can include a number of points less than or equal to the number of sensor electrodes along the given axis.

Measurement(s) of capacitance by the processing system 110, such as capacitive image(s) or capacitive profile(s), enable the sensing of contact, hovering, or other user input with respect to the formed sensing regions by the sensor electrode collection 208. The determination module 260 can utilize the measurements of capacitance to determine positional information with respect to a user input relative to the sensing regions formed by the sensor electrode collection 208. The determination module 260 can additionally or alternatively use such measurement(s) to determine input object size and/or input object type.

Processing system 110A and processing system 110B also include a display driver 180 that drives display elements of input device 100 for display updates. In various embodiments, display driver 180 may drive gate lines and source lines, where gate lines select a row of display elements for display updating and source lines provide display update values to particular sub-pixel elements. In the description below, any portion (including all) of functionality related to display updating described as being performed by the processing system 110 may be considered to be performed by the display driver 180.

Figure 3:
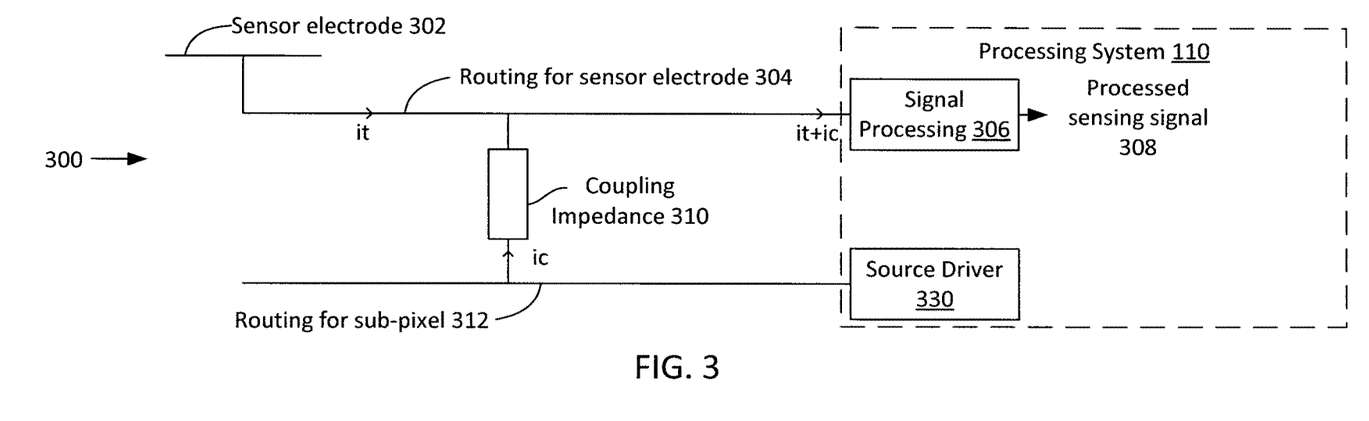
FIG. 3 is a schematic diagram of a routing configuration, according to an example.

FIG. 3 is a schematic diagram of a routing configuration 300, according to an example. As shown, the routing configuration 300 includes a routing 304 for a sensor electrode 302 (which may, for example, be a sensor electrode such as sensor electrodes 220 or sensor electrodes 230 of FIG. 2A, or sensor electrodes 210 of FIG. 2B) and a routing 312 for a sub-pixel. Processing system 110 is coupled to sensor electrode routing 304 and sub-pixel routing 312.

The sensor electrode routing 304 electrically couples sensor electrode 302 to signal processing unit 306 (which may be a portion of processing system 110, such as a part of determination module 260). The sub-pixel routing 312 electrically couples a display sub-pixel (not shown in FIG. 3) to a source driver 330, which may be a part of processing system 110 (e.g., part of display driver 180) of FIG. 1. Coupling impedance 310 represents a capacitive coupling between sensor electrode routing 304 and sub-pixel routing 312. The coupling impedance 310 exists due to the proximity of the sensor electrode routing 304 to the sub-pixel routing 312.

In operation, processing system 110 (for example, sensor circuitry 240) receives signals with a sensor electrode 302, the signals being indicative of presence (or lack thereof) of an input object 140 in a sensing region of the input device 100. The received signals are provided to a signal processing unit 306, which processes the signal to generate processed sensing signal 308, which may be processed by other elements in processing system 110 to determine presence of an input object 140 proximate to sensor electrode 302. The signal processing unit 306 may include various elements that perform functions such as sampling through charge integration, signal filtering, demodulation, and the like, and can include elements such as an operational amplifier with capacitive feedback, a demodulator, a filter, and other mechanisms.

In order to receive the signals with the sensor electrode 302, processing system 110 may drive the sensor electrode 302 in an absolute capacitance or transcapacitance mode. Driving sensor electrode 302 in an absolute capacitance mode may comprise varying the voltage at the sensor electrode 302 with respect to the input object 140 so that a current is induced on sensor electrode routing 304 that is dependent on the degree of capacitive coupling between the input object 140 (if present and/or capacitively coupled to sensor electrode 302) and sensor electrode 302, in an absolute capacitance sensing scheme. The current induced in sensor electrode routing 304 in response to driving the sensor electrode 302 is labeled as "it" in FIG. 3. Note that varying the voltage at sensor electrode 302 with respect to the input object 140 may be accomplished by modulating the voltage of the sensor electrode 302 with respect to a system ground.

Driving sensor electrode 302 in a transcapacitance mode may comprise holding the voltage at the sensor electrode 302 constant with respect to system ground while driving a different sensor electrode 302 with a signal having a varying voltage.

Sub-pixel routing 312, which provides signals for updating display elements (not shown in FIG. 3), may be near to the sensor electrode routing 304 that is coupled to the sensor electrode 302 with which the signals are received. When a signal is driven onto sub-pixel routing 312 by a source driver, some current is driven onto sensor electrode routing 304 due to coupling impedance 310. This current is referred to as a "corrupting current" ic.

The current that arrives at signal processing unit 306 is thus a combination of the corrupting current "ic" from sub-pixel routing 312 and the current from sensor electrode "it". Thus, the processed sensing signal 308 is affected by current induced by display updating, a phenomenon that is unrelated to detection of an input object 140 near the sensor electrode 302. By affecting what is processed by signal processing unit 306, the corrupting current from the display elements may hinder the ability of processing system 110 to detect presence, position, or other characteristics (e.g., height, size, or the like) of an input object 140.

To improve ability to detect presence of an input object 140, techniques for removing the corrupting current are provided herein. These techniques help the processed signal more accurately reflect an input object 140 near sensor electrode 302. The techniques are used in the context of displays that perform "dot inversion" display element driving, described in more detail below.

Figure 4:
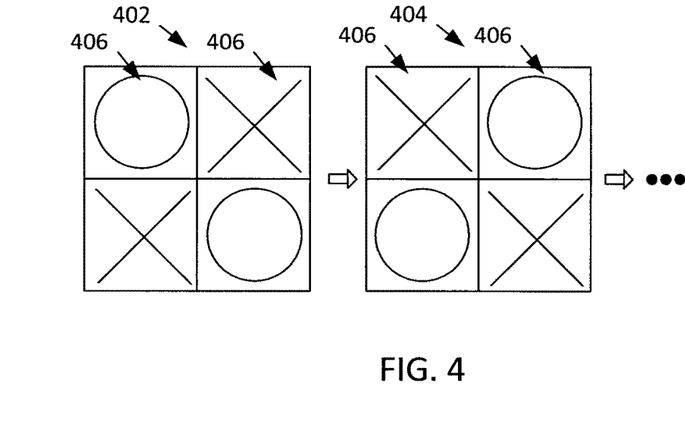
FIG. 4 is a diagram that illustrates aspects of dot inversion, according to an example.

FIG. 4 is a diagram that illustrates aspects of dot inversion, according to an example. FIG. 4 illustrates a first frame portion 402 and a second frame portion 404. Each frame portion is a portion of a particular frame and shows only four sub-pixels of a display for that frame, but it should be understood that in various embodiments, dot inversion is generally applied to larger portions of a frame in a display, such as to substantially each sub-pixel in a display. The frame that includes the second frame portion 404 is immediately subsequent, time-wise, to the frame that includes the first frame portion 402.

Dot inversion is a display driving scheme for avoiding fouling of display elements. More specifically, many types of displays, such as liquid crystal displays, include a light characteristic varying element in each sub-pixel for controlling the brightness of the color for that particular sub-pixel. The light characteristic varying element is controlled electrically, by, for example, varying the voltage across the element in order to control sub-pixel brightness. This element may be fouled by repeated application of the same voltage.

For this reason, displays typically utilize a display driving scheme in which the polarity with which each sub-pixel element is driven is reversed every frame. The term "polarity" refers to whether the voltage is higher than or lower than a reference voltage. More specifically, the voltage that is applied to the light characteristic varying element may be applied by applying a voltage to a sub-pixel electrode that is higher than a reference voltage, in which case the polarity would be considered positive, or applying a voltage to the sub-pixel electrode that is lower than a reference voltage, in which case the polarity would be considered negative. The brightness of the sub-pixel does not depend on the polarity of the voltage applied, but instead on the magnitude. Thus, varying voltage in this manner does not significantly affect the sub-pixel brightness. "Reversing" the polarity refers to changing the polarity from negative to positive or positive to negative.

Dot inversion is a scheme in which the polarity of the voltage with which each sub-pixel is driven is reversed each frame, as described above, and in which, within each frame, the polarity with which each sub-pixel is driven is the reverse of the polarity with which each neighboring (vertically and horizontally) sub-pixel is driven. Thus, in the first frame portion 402, two sub-pixels 406 are driven with a voltage having a first polarity, indicated with an "X," and two sub-pixels 406 are driven with a voltage having a second polarity that is opposite from the first polarity, indicated with an "O." In the second frame portion 404, each of the sub-pixels 406 is driven with a voltage having the opposite polarity of the polarity that the sub-pixel 406 is driven in the first frame portion 402. In accordance with dot inversion, frames of the display alternate between states like the first frame portion 402 and the second frame portion 404. In other words, each frame, a sub-pixel is driven with a voltage that is opposite in polarity to the voltage that the sub-pixel was driven the previous frame. Additionally, in each particular frame, adjacent sub-pixels are driven with opposite polarities.

Figure 5:
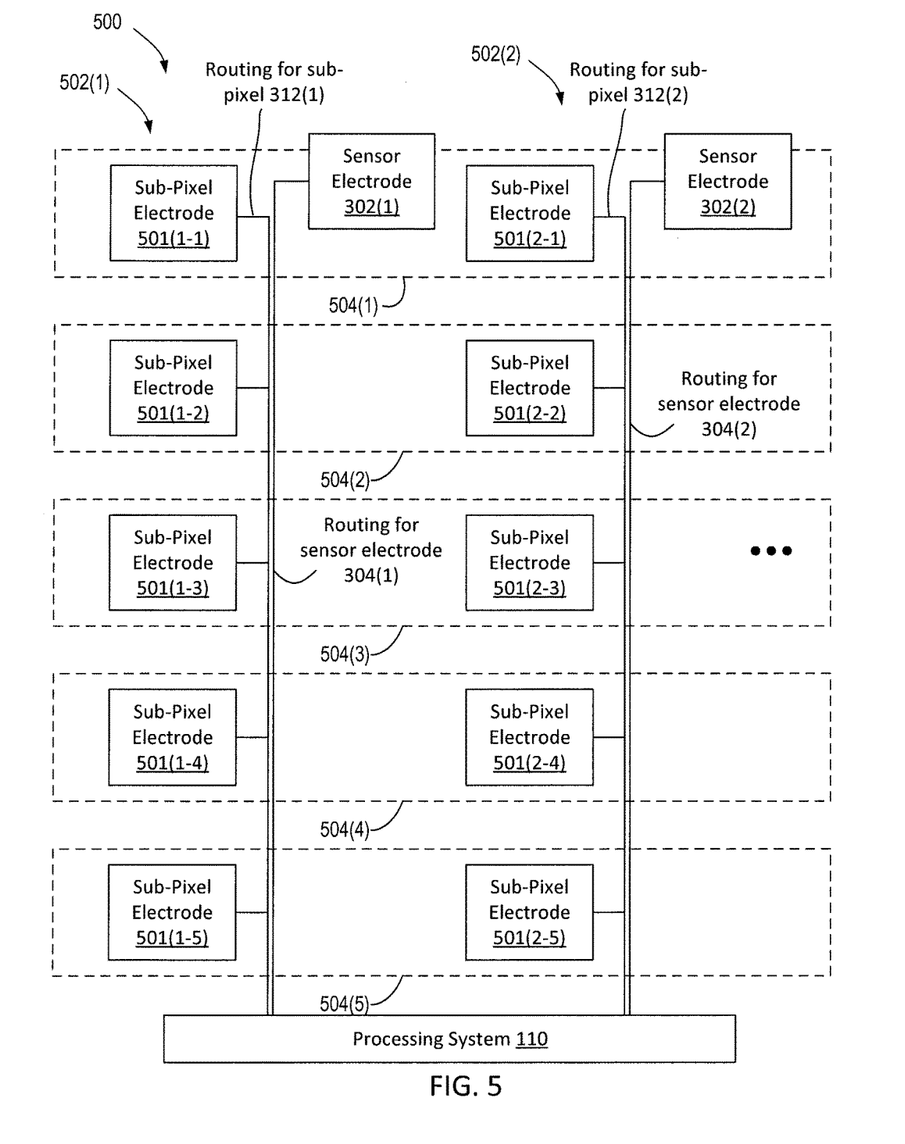
FIG. 5 is a schematic diagram that illustrates a routing layout within an input device, according to an example.

FIG. 5 is a schematic diagram that illustrates a routing layout 500 within an input device 100, according to an example. As shown, the routing layout 500 includes sub-pixel electrodes in a first column 502(1) and sub-pixel electrodes in a second column 502(2). These columns 502 include sub-pixel electrodes 501 that are arrayed vertically in the input device 100. The sub-pixel electrodes 501 are also arrayed in rows 504 that are arrayed horizontally in the input device 100.

The sub-pixel routings 312 are arrayed parallel to the sensor electrode routings 304. Further, the sub-pixel routings are arrayed in a direction that is parallel to the direction of the columns 502. Although the sub-pixel routings 312 and sensor electrode routings 304 are shown side-by-side in FIG. 5, those of skill in the art will recognize that FIG. 5 is schematic and that the sub-pixel routings 312 and sensor electrode routings 304 may be arrayed in other relative positions. For example, as an alternative to being located in the same layer, sub-pixel routings 312 may be disposed in a layer above or below the layer in which sensor electrode routing 304 is disposed, and/or may be disposed substantially directly above the sensor electrode routing 304 or above and to the side of the sensor electrode routing 304.

In operation, processing system 110 "scans" through the sub-pixel electrodes 501 to perform display updates. Processing system 110 scans row-by-row, updating pixels in one row 504 before proceeding to the next row 504 below. Particular rows are selected for updating by asserting a gate line corresponding to that row. Note that gate lines and components for selecting particular sub-pixels for updating are not illustrated in FIG. 5. Sub-pixel electrode 501(1-1) is driven by asserting a gate signal corresponding to row 504(1) and driving sub-pixel routing 312(1) with an update signal. Note also that sub-pixel electrodes 501 in the same column 502 share a sub-pixel routing 312.

In various embodiments, processing system 110 drives sensor electrodes 302 with a signal while driving sub-pixel electrodes 501 for display updates. Note that although sensor electrode 302(1) is illustrated as being near sub-pixel electrode 501(1-1) (as are sub-pixel electrode 501(2-1) and sensor electrode 302(2)), in various embodiments, sensor electrodes 302(1) that are driven for sensing may not be driven at the same time as sub-pixel electrodes 501(1-1) that are nearby. In some embodiments, the term "nearby" means a sub-pixel electrode 501 that is directly above or below a sensor electrode 302, or next to and within the same layer as a sensor electrode 302.

Note that in various embodiments, sensing and display updating may be performed "simultaneously." The term "simultaneously" means that touch sensing for one or more sensor electrodes of the input device 100 is performed at the same time as display updates with one or more of the display elements of the input device 100. Sensing and display updating may alternatively be performed at different times, but in a single, common frame in which display updates and sensing is performed. Sensing and display updating may be performed in separate but at least partially overlapping periods. In other words, display updating may be performed during a first period and sensing may be performed during a second period, where the first period and second period at least partially overlap.

Sensing electrodes may be integrated with display elements. Sensing and display updating may involve updating display elements while also sensing with sensing elements integrated with those display elements. Alternatively or additionally, sensing may involve updating display elements while sensing with sensing elements other than those that are integrated with the display elements, as well as sensing with sensing elements while updating display elements other than those that are integrated with the sensing elements.

In various embodiments, processing system 110 drives a sensor electrode 302 for sensing in a period during which multiple rows 504 of sub-pixel electrodes 501 are updated for display. Because multiple sub-pixel electrodes 501 share a sub-pixel routing 312, multiple units of corruption current are added to the signal received with the sensor electrode 302 while the sensor electrode 302 is driven for sensing. Because multiple units of corruption current are added, corruption current can be reduced or removed with a specific timing ratio between touch and display update. More specifically, the length of time over which sensing is performed for a particular sensor electrode 302 should be approximately equal to the time for driving an even number of display rows 504. Note that the length of time in which sensing is performed (a "sensing period") may at least partially overlap with a period in which display updates are performed ("a display update period"). In other words, a sensing period may be said to at least partially overlap an update period. However, during the sensing period, display updates are performed for an even number of rows.

Because of the dot-inversion scheme described above with respect to FIG. 4, the amount of corrupting current applied by display updates flips direction for each row 504. Thus, if an even number of display rows 504 are driven while a particular sensor electrode 302 is driven for sensing, then the corrupting current is at least partially canceled out (with the best case scenario being that adjacent sub-pixels are driven with equal voltages, implying an image of completely solid color).

Note that sub-pixel electrodes in consecutive rows may be driven with different signals (i.e., to produce different colors/ brightnesses) if the image to be displayed is not simply a solid color. Thus, corrupting current may not be less-than-ideally canceled in certain situations. However, performing capacitive sensing while an even number of display rows are being updated cancels corrupting signals in the best case scenario, and in the worst case scenario, adds no noise. Thus, aligning sensor timing with an even number of display line updates is advantageous.

Additional detail regarding cancellation of corrupting signals is now provided. To drive sub-pixel electrodes 501 for display updates, voltages are applied to the sub-pixel electrodes 501. Display elements may include two electrodes that form a capacitor with a material between the two electrodes that varies characteristics related to light transmitted through that material based on a voltage across that material. One of those electrodes (a common voltage electrode) provides a reference voltage (which may be referred to as a common voltage or "VCOM") against which the other electrode (the sub-pixel electrode 501) may apply a voltage to set the variable characteristic (e.g., light polarization direction in a liquid crystal type display) of the transmissive material. Setting the variable characteristic of the transmissive material may be referred to herein as "updating the display element." As described above, with dot inversion, adjacent sub-pixels electrodes 501 are driven with voltages of opposite polarities with respect to VCOM. The term "polarity" refers to whether the sub-pixel electrode 501 is driven with a voltage that is greater than VCOM or driven with a voltage that is less than VCOM.

When processing system 110 drives a sub-pixel electrode 501 with a positive polarity, the sub-pixel routing 312 to that sub-pixel induces a current flow in sensor electrode routing 304 that is equal to $$C\frac{dV}{dt},$$

where C is the capacitance of the capacitive coupling between the sub-pixel routing 312 and the sensor electrode routing 304 (coupling impedance 310) and V is the voltage difference between the voltage at the sub-pixel routing 312 and the sensor electrode routing 304. When processing system 110 drives a sub-pixel electrode 501 with a negative polarity, the sub-pixel routing 312 to that sub-pixel induces a current flow in sensor electrode routing 304 that is equal to $$-C\frac{dV}{dt},$$

which is negative because the voltage change dV/dt is a negative value. If an even number of rows 504 are driven during a period in which the same sensor electrode 302 is driven, then the number of positive corrupting current contributions is equal to the number of negative corrupting current contributions, and the amount of corrupting current injected by display elements is at least partially cancelled out. For these reasons, processing system 110 is configured to drive a sensor electrode 302 for sensing during a period in which an even number of rows 504 are driven for display updating. As stated above, the degree to which corrupting current is canceled out is dependent on the uniformity of the image displayed.

Figure 6:
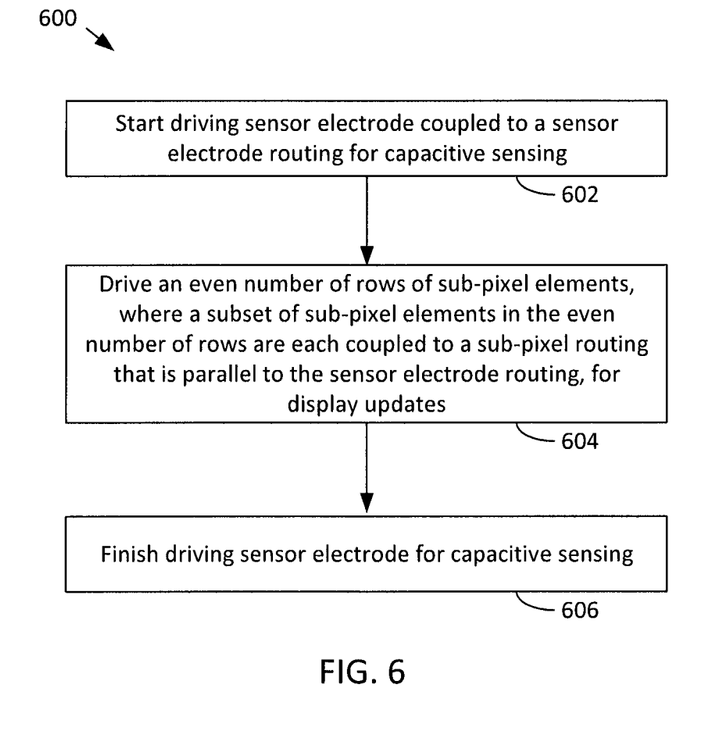
FIG. 6 is a flow diagram of a method for performing sensing and updating display elements in a manner that reduces display element noise, according to an example.

FIG. 6 is a flow diagram of a method 600 for performing sensing and updating display elements in a manner that reduces display element noise, according to an example. Although described with respect to the system of FIGS. 1-5, those of skill in the art will understand that any system configured to perform the steps in various alternative orders is within the scope of the present disclosure.

The method 600 begins at step 602, where processing system 110 drives a sensor electrode 302 for capacitive sensing. In some embodiments, processing system 110 drives the sensor electrode 302 by transmitting a varying voltage on sensor electrode 302. In other embodiments, processing system 110 may hold the voltage at a sensor electrode 302 constant to receive with that sensor electrode 302 while driving a different sensor electrode 302 with a signal, or while input device 100 modulates its power supply to cause voltages of the input device 100 to vary with respect to an input object 140. Processing system 110 continues driving the sensor electrode 302 for capacitive sensing throughout steps 602 and 604, until step 606.

At step 604, using a dot inversion scheme, processing system 110 drives an even number of rows 504 of sub-pixel electrodes 501 for display updates while driving the sensor electrode 302 for capacitive sensing. In some embodiments, driving an even number of rows 504 comprises, for each of an even number of rows, asserting a gate line and driving the sub-pixel electrodes 501 that are selectably coupled to that gate line with a signal to update the corresponding sub-pixel.

The even number of rows includes one or more columns 502 that includes sub-pixel electrodes 501, each of which is coupled to the same sub-pixel routing 312, where the sub-pixel routing is parallel to a sensor electrode routing 304 that is coupled to the sensor electrode 302 that processing system 110 starts driving at step 602. The sensor electrode routing 304 is driven with corrupting current induced by driving the various sub-pixel electrodes 501 that are coupled to the above-mentioned same sub-pixel routing 312. Because an even number of rows are driven, and because the sub-pixel electrodes 501 are driven using a dot-inversion technique, corrupting current induced by driving the sub-pixel electrodes 501 is canceled (to a greater or lesser degree depending on the image displayed by the sub-pixel electrodes 501).

At step 606, processing system 110 stops driving the sensor electrode 302. Subsequently, processing system 110 may drive other electrodes and/or may process the signal received with the sensor electrode 302 that was driven to determine characteristics such as presence and location of an input object 140.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system configured for updating an array of sub-pixel elements and performing capacitive sensing, the processing system comprising:
a display driver configured to be coupled to a first sub-pixel element and a second sub-pixel element of the array, wherein the first and second sub-pixel elements are configured to be coupled to a source driver via a first source line and provided on adjacent rows of the array, the display driver configured to:
drive the first sub-pixel element with a first update signal during a first display update period; and
drive the second sub-pixel element with a second update signal during the first display update period, wherein the first and second update signals are opposite in polarity; and
sensor circuitry configured to mitigate corrupting currents induced by the first and second update signals in a first sensor electrode routing located proximate to the first source line by:
receiving first resulting signals via the first sensor electrode routing when an even number of rows in the array of sub-pixel elements are driven for display updates, wherein the first resulting signals are received during a first sensing period that at least partially overlaps the first display update period.

2. The processing system of claim 1, wherein driving the first update signal and the second update signal causes corrupting currents to change polarity in each row of the array of sub-pixel elements.

3. The processing system of claim 2, wherein a number of positive polarity corrupting currents is equal to a number of negative polarity corrupting currents in the first sensor electrode routing when an even number of rows are driven for display updates.

4. The processing system of claim 1, wherein the first source line and the first sensor electrode routing are disposed in a common layer.

5. The processing system of claim 1, wherein the first source line and the first sensor electrode routing are disposed in different layers, and wherein the first source line and the first sensor electrode routing are parallel to each other.

6. The processing system of claim 1, wherein the sensor circuitry is further configured to:
drive the first sensor electrode routing in an absolute sensing mode.

7. The processing system of claim 1, wherein:
the display driver is further configured to be coupled to a third sub-pixel element of the array, wherein the third sub-pixel element is configured to be coupled to the source driver via a second source line and provided on the same row of the array as the first sub-pixel element, the display driver configured to:
drive the third sub-pixel element with a third update signal having the same polarity as the second sub-pixel element, wherein the third sub-pixel element is adjacent to the first sub-pixel element; and
the sensor circuitry is further configured to be coupled to a second sensor electrode routing located proximate to the second source line, wherein the second sensor electrode routing is configured to be coupled to a second sensor electrode, the sensor circuitry configured to:
receive second resulting signals via the second sensor electrode routing during the first sensing period.

8. The processing system of claim 1, wherein the first sensor electrode routing is coupled to a first sensor electrode of a plurality of sensor electrodes arrayed in a matrix arrangement.

9. An input device configured for updating a display and performing capacitive sensing, the input device comprising:
an array of sub-pixel elements configured to be coupled to a processing system via a plurality of source lines, the plurality of source lines including at least a first source line;
a plurality of sensor electrodes configured to be coupled to the processing system via a plurality of sensor electrode routings, the plurality of sensor electrode routings including at least a first sensor electrode routing located proximate to the first source line;
a display driver configured to be coupled to a first sub-pixel element and a second sub-pixel element of the array, wherein the first and second sub-pixel elements are configured to be coupled to the first source line and provided on adjacent rows of the array, the display driver configured to:
drive the first sub-pixel element with a first update signal having a first polarity during a first display update period; and
drive the second sub-pixel element with a second update signal having a second polarity during the first display update period, wherein the first polarity is opposite the second polarity; and
sensor circuitry configured to mitigate corrupting currents induced by the first and second update signals in the first sensor electrode routing by:
receiving first resulting signals via the first sensor electrode routing when an even number of rows in the array of sub-pixel elements are driven for display updates, wherein the first resulting signals are received during a first sensing period that at least partially overlaps the first display update period.

10. The input device of claim 9, wherein driving the first update signal and the second update signal causes corrupting currents to change polarity in each row of the array of sub-pixel elements.

11. The input device of claim 10, wherein a number of positive polarity corrupting currents is equal to a number of negative polarity corrupting currents in the first sensor electrode routing when an even number of rows are driven for display updates.

12. The input device of claim 9, wherein the first source line and the first sensor electrode routing are disposed in a common layer.

13. The input device of claim 9, wherein the first source line and the first sensor electrode routing are disposed in different layers, and wherein the first source line and the first sensor electrode routing are parallel to each other.

14. The input device of claim 9, wherein the sensor circuitry is further configured to:
drive the first sensor electrode routing in an absolute sensing mode.

15. The input device of claim 9, wherein:
the display driver is further configured to be coupled to a third sub-pixel element of the array, wherein the third sub-pixel element is configured to be coupled to a second source line of the plurality of source lines and provided on the same row of the array as the first sub-pixel element, the display driver configured to:
drive the third sub-pixel element with a third update signal having the second polarity, wherein the third sub-pixel element is adjacent to the first sub-pixel element; and
the sensor circuitry is further configured to be coupled to a second sensor electrode routing of the plurality of sensor electrode routings, wherein the second sensor electrode routing is located proximate to the second source line, the sensor circuitry configured to:
receive second resulting signals via the second sensor electrode routing during the first sensing period.

16. The input device of claim 9, wherein the plurality of sensor electrodes is arrayed in a matrix arrangement.

17. A method for updating an array of sub-pixel elements and performing capacitive sensing, the method comprising:
driving a first sub-pixel element of the array with a first update signal during a first display update period;
driving a second sub-pixel element of the array with a second update signal during the first display update period, wherein the first and second sub-pixel elements are coupled to a source driver via a first source line and provided on adjacent rows of the array, and wherein the first and second update signals are opposite in polarity; and
receiving resulting signals via a sensor electrode routing during a first sensing period when an even number of rows in the array of sub-pixel elements are driven for display updates, to mitigate corrupting currents induced by the first and second update signals in a sensor electrode routing located proximate to the first source line, wherein the first sensing period at least partially overlaps the first display update period.

18. The method of claim 17, wherein:
driving the first update signal and the second update signal causes corrupting currents to change polarity in each row of the array of sub-pixel elements.

* * * * *